(12) United States Patent
Filip et al.

(10) Patent No.: US 9,792,021 B1
(45) Date of Patent: Oct. 17, 2017

(54) TRANSITIONING AN INTERFACE TO A NEIGHBORING IMAGE

(71) Applicant: Google Inc., Mountain View, CA (US)

(72) Inventors: Daniel Joseph Filip, San Jose, CA (US); Daniel Cotting, Islisberg (CH)

(73) Assignee: Google Inc., Mountain View, CA (US)

( * ) Notice: Subject to any disclaimer, the term of this patent is extended or adjusted under 35 U.S.C. 154(b) by 729 days.

(21) Appl. No.: 14/304,193

(22) Filed: Jun. 13, 2014

Related U.S. Application Data

(63) Continuation of application No. 13/487,938, filed on Jun. 4, 2012, now Pat. No. 8,788,968.

(51) Int. Cl.
G06F 3/048 (2013.01)
G06F 3/0484 (2013.01)
G06F 3/0487 (2013.01)

(52) U.S. Cl.
CPC ........ *G06F 3/04845* (2013.01); *G06F 3/0487* (2013.01); *G06F 3/04847* (2013.01)

(58) Field of Classification Search
CPC . G06F 3/04845; G06F 3/04847; G06F 3/0487
USPC ........................................................ 715/788
See application file for complete search history.

(56) References Cited

U.S. PATENT DOCUMENTS

| | | | |
|---|---|---|---|
| 6,192,145 B1 | 2/2001 | Anandan et al. | |
| 7,583,275 B2 | 9/2009 | Neumann et al. | |
| 8,159,524 B2 * | 4/2012 | Wilson | G06T 3/005 348/42 |
| 8,289,340 B2 | 10/2012 | Ptucha et al. | |
| 8,345,057 B2 | 1/2013 | Ptucha et al. | |
| 8,363,955 B2 | 1/2013 | Pupilli et al. | |
| 8,411,149 B2 | 4/2013 | Maison et al. | |
| 8,508,651 B2 | 8/2013 | Tsubaki et al. | |
| 8,594,425 B2 | 11/2013 | Gurman et al. | |
| 8,755,606 B2 * | 6/2014 | Yates | G06T 17/05 382/192 |

(Continued)

OTHER PUBLICATIONS

Burt, Peter J. and Adelson, Edward H., "A Multiresolution Spline With Application to Image Mosaics", ACM Transactions on Graphics, vol. 2 No. 4, Oct. 1983, pp. 217-236.

(Continued)

*Primary Examiner* — David Phantana Angkool
(74) *Attorney, Agent, or Firm* — Lerner, David, Littenberg, Krumholz & Mentlik, LLP

(57) ABSTRACT

Methods, systems, and computer program products for transitioning an interface to a related image are provided. A method for transitioning an interface to a related image may include receiving information describing a homography between a first image and a second image, and adjusting the interface to present the second image at one or more transition intervals in a transition period until the second image is fully displayed and the first image is no longer visible. The interface may be adjusted by determining, based on the homography, a region of the second image to overlay onto a corresponding area of the first image, blending the determined region with the corresponding area to reduce visible seams occurring between the first image and the second image, and updating the interface by gradually decreasing visual intensity of the first image while gradually and proportionally increasing visual intensity of the second image.

18 Claims, 9 Drawing Sheets

(56) References Cited

U.S. PATENT DOCUMENTS

| | | | |
|---|---|---|---|
| 9,262,067 B1* | 2/2016 | Bell | G06F 3/0488 |
| 9,448,704 B1* | 9/2016 | Belhumeur | G06F 3/04842 |
| 2010/0309167 A1* | 12/2010 | Nam | G06F 3/044 |
| | | | 345/174 |
| 2011/0029562 A1 | 2/2011 | Whitby et al. | |
| 2011/0029914 A1 | 2/2011 | Whitby et al. | |
| 2011/0091076 A1* | 4/2011 | Schultz | G01C 11/02 |
| | | | 382/106 |
| 2011/0157221 A1 | 6/2011 | Ptucha et al. | |
| 2011/0244919 A1* | 10/2011 | Aller | G06K 9/00973 |
| | | | 455/556.1 |
| 2011/0310088 A1* | 12/2011 | Adabala | G06T 19/003 |
| | | | 345/419 |
| 2011/0312374 A1* | 12/2011 | Chen | H04N 5/23222 |
| | | | 455/556.1 |
| 2012/0072863 A1* | 3/2012 | Akifusa | G06F 3/0482 |
| | | | 715/784 |
| 2012/0200702 A1* | 8/2012 | Wilson | G06T 3/005 |
| | | | 348/144 |
| 2016/0005229 A1* | 1/2016 | Lee | G06F 3/0488 |
| | | | 345/419 |
| 2016/0011769 A1* | 1/2016 | Zou | G06T 11/00 |
| | | | 715/863 |
| 2017/0018086 A1* | 1/2017 | Zhang | H04N 5/232 |
| 2017/0091943 A1* | 3/2017 | Pan | G06K 9/481 |
| 2017/0124434 A1* | 5/2017 | Goodwin | G06K 9/66 |
| 2017/0171430 A1* | 6/2017 | Tanaka | H04N 1/442 |

OTHER PUBLICATIONS

"Navigate your way through user photos in Street View," Google Lat Long Blog, http://google-latlong.blogspot.com/2010/02/navigate-your-way-through-user-photos.html, Feb. 26, 2010, 3 pages.

Snavely et al., "Photo Tourism: Exploring Photo Collections in 3D," ACM Transactions on Graphics, 2006, 12 pages.

* cited by examiner

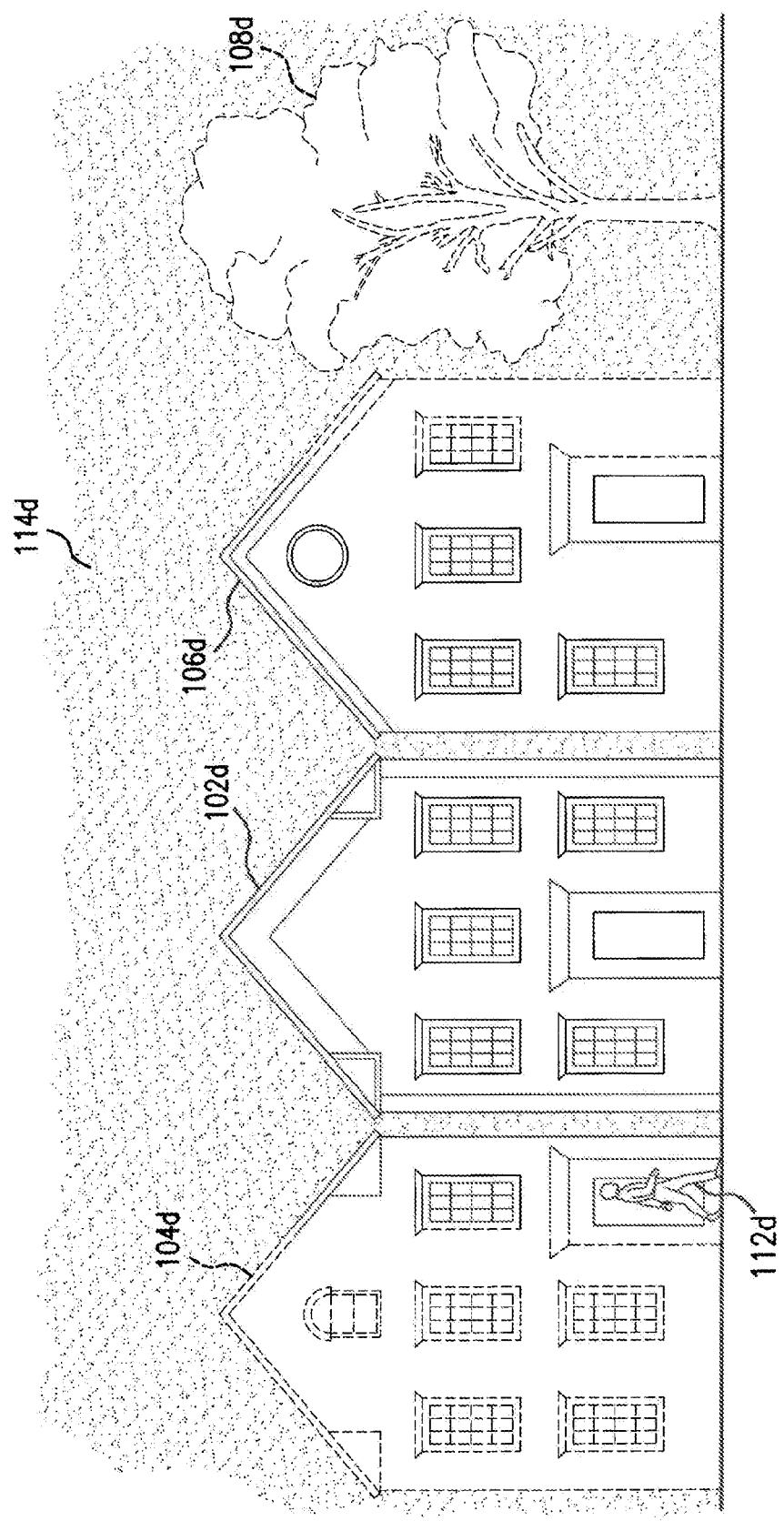

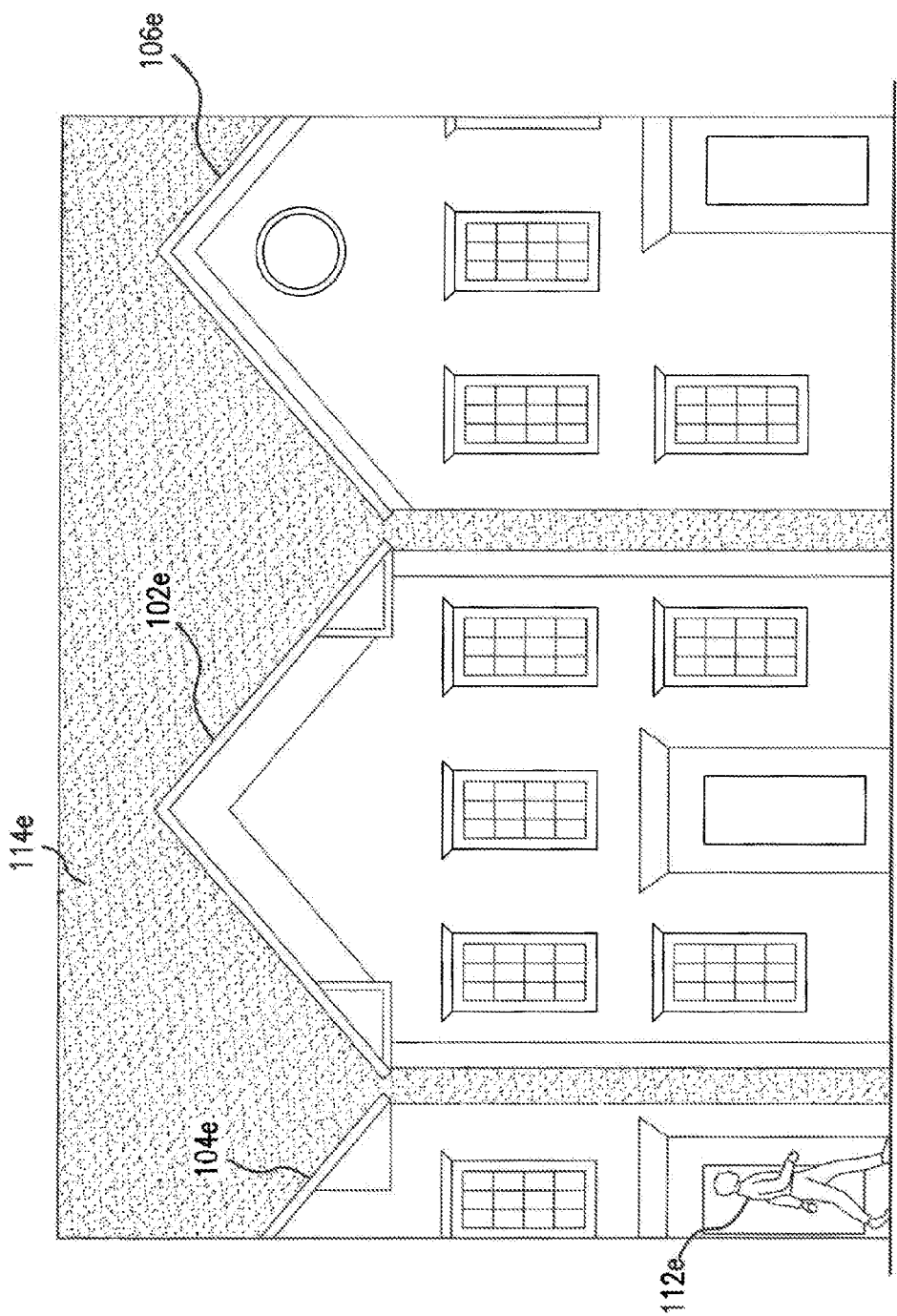

TRANSITIONING AN INTERFACE TO A NEIGHBORING IMAGE

CROSS-REFERENCE TO RELATED APPLICATIONS

The present application is a continuation of U.S. patent application Ser. No. 13/487,938, filed Jun. 4, 2012, the disclosure of which is incorporated herein by reference.

TECHNICAL FIELD

Embodiments generally relate to the display of geolocated images.

BACKGROUND

Online map services enable users to explore maps, locate points of interest, plan trips, obtain driving directions, and view real-time driving conditions. In addition, several web-based mapping services also provide 360-degree street-level panoramas that users can view and navigate.

The images used to create the panoramas are captured, for example, by mounting specially-designed cameras onto vehicles. Each camera may include multiple lenses to record an environment from a full 360-degree perspective while the vehicle moves along a roadway. The recorded imagery is then used to create the panoramas, which enable users to virtually explore a geographic location using a web browser.

In addition, smartphones equipped with one or more high-quality digital cameras, GPS, abundant storage space, and mobile broadband have become common throughout the world. These powerful devices enable users to easily capture and distribute photographs and video content, and have contributed to the surge of shared imagery available on the internet.

Many of the available images include location information, such as latitude and longitude, which allow an image to be associated with maps and other geolocated imagery.

BRIEF SUMMARY

Embodiments generally relate to transitioning an interface from a first displayed image to a related image. In one embodiment, a method for transitioning an interface to a related image includes receiving information describing a homography between a first image and a second image, receiving a user selection to transition the interface from the first image to the second image, and adjusting the interface to present the second image at one or more transition intervals in a transition period until the second image is fully displayed and the first image is no longer visible. The interface is adjusted by determining, based on the homography, a region of the second image to overlay onto a corresponding area of the first image, blending the determined region with the corresponding area to reduce visible seams occurring between the first image and the second image, and updating the interface by gradually decreasing visual intensity of the first image while gradually and proportionally increasing visual intensity of the second image.

In another embodiment, a system for transitioning an interface to a related image includes a processor, a content receiver module, a selection processor module, and a user interface display module. The content receiver module is configured to receive information describing a homography between a first image and a second image. The selection processor module is configured to receive a user selection to transition the interface from the first image to the second image. The user interface display module is configured to adjust the interface to present the second image at one or more transition intervals in a transition period until the second image is fully displayed and the first image is no longer visible by determining, based on the homography, a region of the second image to overlay onto a corresponding area of the first image, blending the determined region with the corresponding area to reduce visible seams occurring between the first image and the second image, and updating the interface by gradually decreasing visual intensity of the first image while gradually and proportionally increasing visual intensity of the second image.

In an additional embodiment, a computer-readable storage medium has control logic recorded thereon that when executed by a processor, causes the processor to transition an interface to a related image. The control logic includes computer-readable program code to cause the processor to receive information describing a homography between a first image and a second image, receive a user selection to transition the interface from the first image to the second image, and adjust the interface to present the second image at one or more transition intervals in a transition period until the second image is fully displayed and the first image is no longer visible. The control logic also includes computer-readable program code to adjust the interface by determining, based on the homography, a region of the second image to overlay onto a corresponding area of the first image, blending the determined region with the corresponding area to reduce visible seams occurring between the first image and the second image, and updating the interface by gradually decreasing visual intensity of the first image while gradually and proportionally increasing visual intensity of the second image.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form part of the specification, illustrate embodiments of the present invention and, together with the description, further serve to explain the principles of the embodiments and to enable a person skilled in the relevant art(s) to make and use the embodiments.

FIGS. 1A-1E are exemplary sketches illustrating transitioning an interface to a related image, according to an embodiment.

Figure 1A:
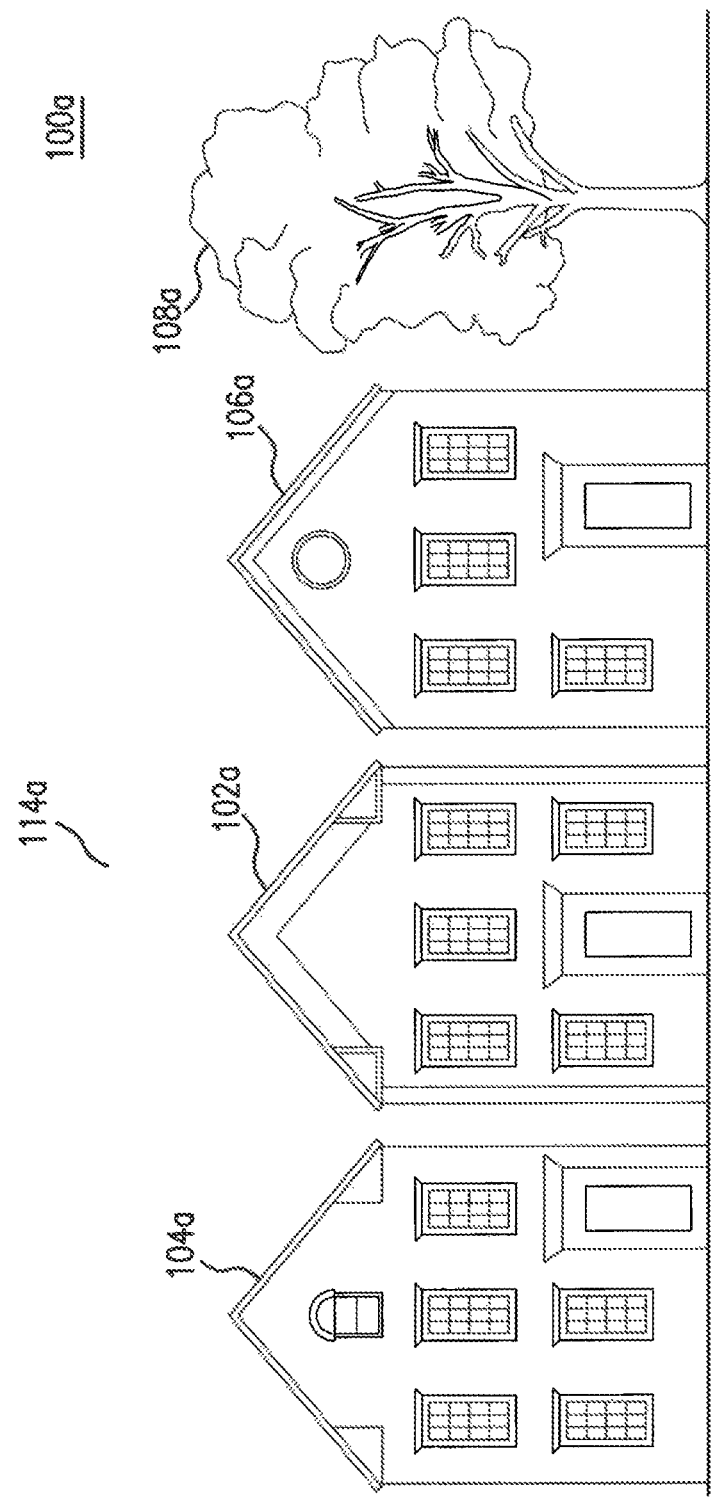

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structur-

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic with other embodiments whether or not explicitly described.

Embodiments include methods and systems for transitioning an interface from a first image to a related image.

Online map services present maps, directions, and other beneficial information to users. Additionally, millions of shared geolocated images capture points of interest and other locations at different times and from various perspectives. In the embodiments described below, improved techniques for transitioning an interface between related geolocated images are provided.

For example, a user viewing a geolocated image in a web browser interface may be presented with one or more indications of available imagery capturing at least some portion of the same scene. The user may transition the interface from a displayed image to an available image by performing one or more actions (such as clicking a button), one or more motions (such as swiping or scrolling), or a combination of at least one action and at least one motion. However, the source and destination images may have been taken at different times, from different angles, with different background scenery, and with different photographic properties. Such differences could lead to an awkward and visually disruptive transition between the images, which may include flickering, choppiness, and other visual abnormalities that can distract and annoy a user.

In an embodiment, the interface is configured to present a smooth and consistent transition between related images by incrementally transitioning and blending the images at one or more transition intervals. For example, the image displayed in the interface is gradually faded out at one or more transition intervals while a related image is gradually faded in at the one or more transition intervals. In addition, the images are also blended at one or more of the transition intervals based on matching features. The blending reduces visible edges occurring at areas of overlap and the presence of other differences that may exist between the images, including but not limited to variance in color and brightness. This results in a smoother and more seamless transition between two related images.

For example, according to an embodiment, a user may select a photograph of a landmark from a map, panorama, or other user interface provided in a web browser. A corresponding request, which may include a geographic location associated with the selection, is then sent to a map service provider.

The online map service searches through information it has collected and compiled about available imagery and returns image information to the user's computing device for processing. The image information may indicate one or more online source of each available image, one or more image properties of each available image, the geographic location associated with each available image, and information indicating and/or describing one or more relationships that may exist between the first image and one or more of the available images.

In one example, available images are considered to be geographically related to the first image because each image is associated with a location in roughly the same geographic vicinity. In another example, the available images are further related to the first image because the available images include some of the same content and/or scenery as the first image. For example, the first image may be a photograph taken of a landmark, which may also appear at different angles, perspectives, and distances in the available images. Further, a number of available images may capture some of the same buildings and background scenery near the landmark, but not the landmark itself.

The available images capturing at least some of the same objects and scenery as the first image are spatially related to the first image. Such a relationship can be represented as a homography. A homography describes the transition of a perceived view of an observed object (e.g., the landmark in the above example embodiments) when the point of observation is changed. This means that a view provided by a photograph of the monument taken from the air can be mapped to another view of the monument captured in a photograph taken from the ground. Further, homographies may be described mathematically as projective transformations.

In an embodiment, information describing a homography between the first image and an available image may be used to configure, format, and annotate the interface prior to displaying the first image. For example, one or more graphical representations may be displayed with the first image to indicate availability of other images having a homography with the first image.

In one embodiment, a selectable button may be superimposed on the first image near the right edge to indicate an available image positioned to the right of the first image, as indicated by a homography. Other types of graphical representations may include directional symbols, such as arrows, which may, in addition to their position within the interface, indicate the location or direction of available imagery in relation to the first image. In other embodiments, graphical representations also may indicate opportunities to zoom in or out from a scene captured by the first image using one or more available images.

In another embodiment, the user selects an image to display from one of the available images. For example, the user may click a graphical representation indicating an available image or may click and drag the first image to display the second image. Further, the user may completely control the transition during the motion, meaning the transition between the first image and the available image may occur in proportion to the distance and speed at which the user performs the motion. In an embodiment, the user may also pause the transition by ceasing the motion. In an additional embodiment, the user may also reverse the direction of the transition by reversing the direction of the motion. Various motions, such as scrolling, swiping, and dragging can be used to transition from the first image to an available image.

In an embodiment, a transition period (duration), and a number of transition intervals (transition points) are determined to transition the interface from the first image to an available image. The interface is then gradually adjusted at one or more of the determined intervals where a determined region of the available image is blended onto a matching area of the first image to reduce noticeable seams and other visual differences that may exist.

In another embodiment, two or more images may be blended to match differences in color and to reduce other noticeable differences that may appear at aligned or overlapping areas. For example, image blending may be performed to blend and smooth a visible seam caused by color and lighting differences between two different images. Additionally, the interface is updated at one or more of the determined intervals by gradually decreasing the visual intensity of the first image while gradually and proportionally increasing the intensity of the available image. The blending and fading occur at one or more transition intervals until the available image is fully displayed in the interface and the first image is no longer visible. Thus, the features of first image are gradually phased out of the interface while the features of the available image are gradually, and in some embodiments proportionally, phased into the interface.

In an exemplary embodiment, multi-band blending is applied at one or more transition intervals to provide a smooth and near-seamless transition between the images. Multi-band blending reduces variation between the images so that images more closely resemble one another. Such variations are likely to occur when selecting images of the same scenery from photo sharing sources on the internet (considering the very small likelihood that user-provided photographs were captured at the exact same time, under the same conditions, and with the same visual properties). Multi-band blending allows image differences and other visual distractions to be minimized, thus improving the presentation and visual transition between related imagery.

FIGS. 1A-1E are exemplary sketches illustrating transitioning an interface to a related image (transitioning the interface from FIG. 1A to FIG. 1E), according to an embodiment.

FIG. 1A presents first image 100a, which represents a first image provided within an interface, according to an embodiment. First image 100a captures a neighborhood scene from a distance at a first point in time. First image 100a includes house 102a, left neighboring house 104a, right neighboring house 106a, tree 108a, and background 114a.

Figure 1B:
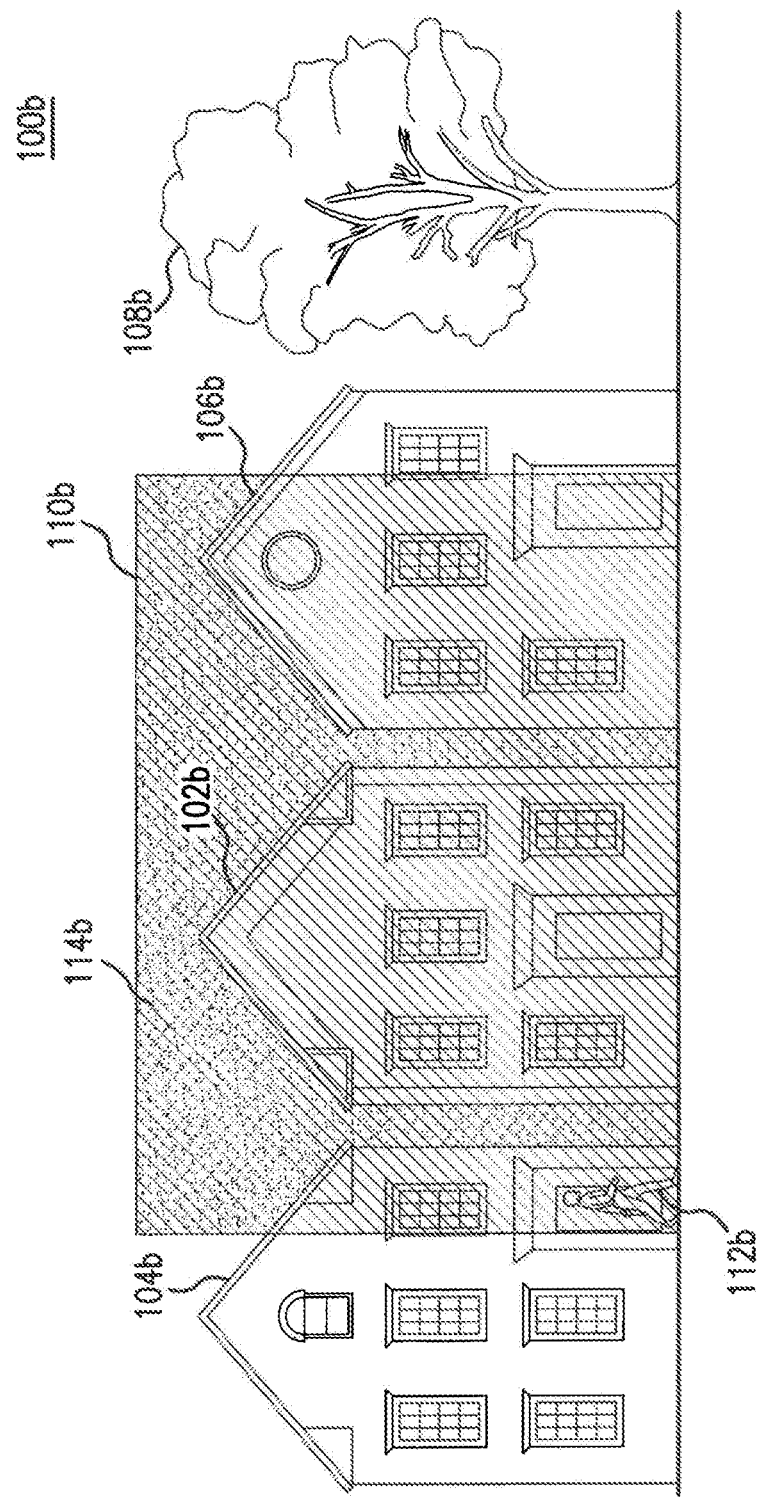

FIG. 1B presents image 100b, which illustrates a relationship between first image 100a and second image 100e, according to an embodiment. Image 100b includes house 102b, left neighboring house 104b, right neighboring house 106b, tree 108b, region 110b, passerby 112b and image background 114b.

The area within region 110b represents the content area of second image 100e, while image 100b represents the entire content area provided by first image 100a. Image 100e, as illustrated through region 110b, provides a close-up view of house 102b and a portion of surrounding scenery provided in image 100a.

First image 100a and second image 100e both include house 102b. However, while first image 100a includes left neighboring house 104b and right neighboring house 106b in their entirety, second image 100e only includes a portion of left neighboring house 104b and a portion of right neighboring house 106b. Further, second image 100e introduces passerby 112b and a dark background 114b, which are not present in first image 100a. Additionally, first image 100a includes tree 108b, which is not present in second image 100e.

Figure 1C:
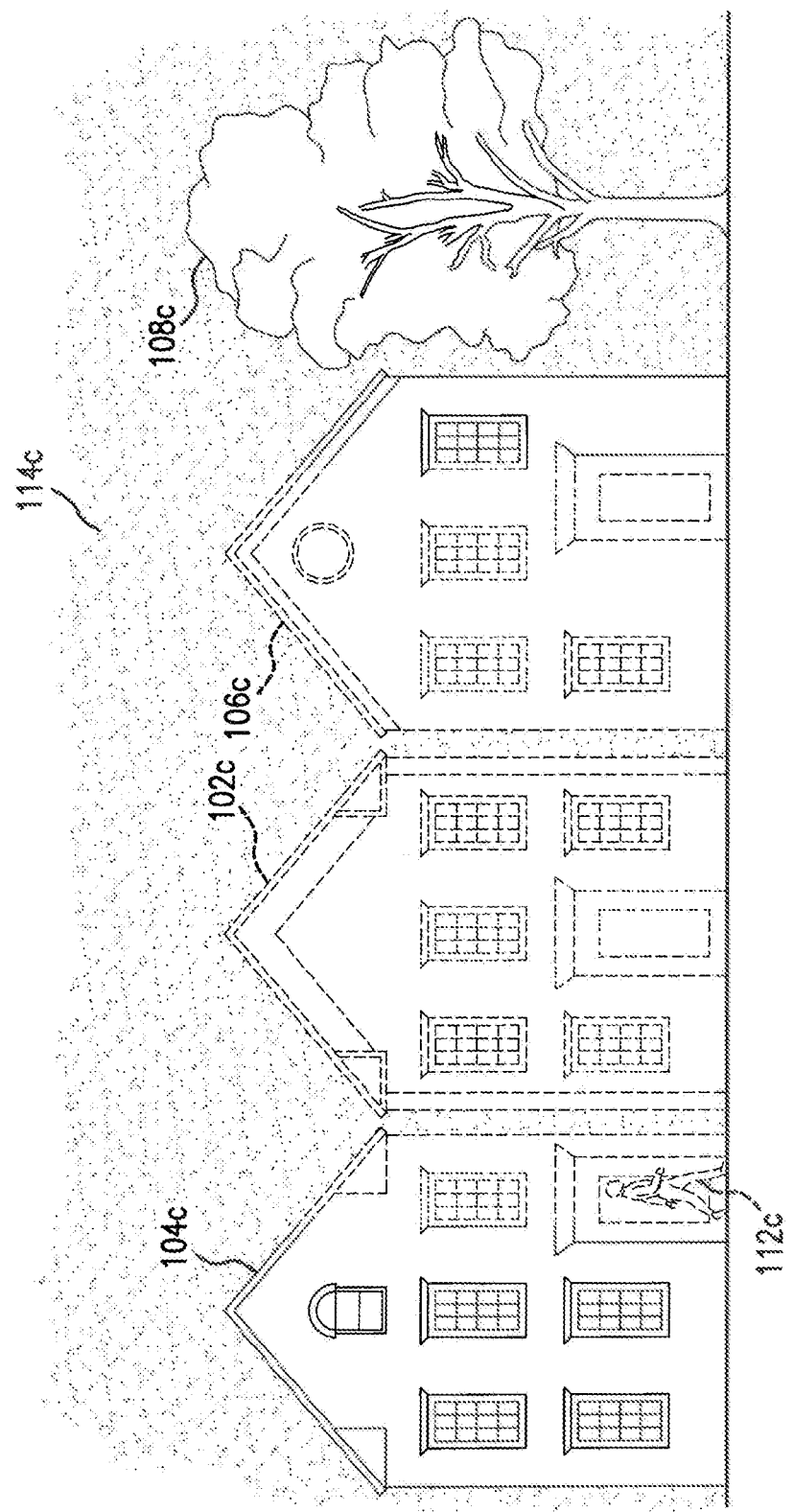

FIG. 1C presents image 100c, which illustrates a first transition point occurring at an early transition interval during the transitioning of an interface from first image 100a to second image 100e, according to an embodiment. Image 100c includes house 102c, left neighboring house 104c, right neighboring house 106c, tree 108c, passerby 112c and image background 114c.

Image 100c illustrates how features of second image 100e may be incrementally introduced and blended with portions of first image 100a as part of a transition between the related images. For example, blending of image features may occur as part of the transition to reduce visible seams and other visual differences that may occur based on differences in image quality, coloring, perspective, and content.

In image 100c, graphical content within previously presented region 110b (representing second image 100e) is overlaid onto and blended with the corresponding area of first image 100a. For example, house 102e from second image 100e is matched and blended with house 102a from first image 100a to produce house 102c (as illustrated by dashed lines). A large portion of right neighboring house 106c is similarly produced. Other areas, such as the majority of left neighboring house 104c and tree 108c initially may remain unaltered, as in image 100c, but will be gradually faded out during additional transition intervals as features of second image 100e increase in strength and features of first image 100a are gradually phased out. Background 114c represents a first phase of gradual blending during a transition from a clear background 114a to a dark background 114e. In addition, passerby 112c is gradually introduced because it does not exist in first image 100a, but is included in second image 100e.

FIG. 1D presents image 100d, which represents a second transition point occurring at a subsequent transition interval during transitioning of the interface from first image 100a to second image 100e, according to an embodiment. Image 100d includes house 102d, left neighboring house 104d, right neighboring house 106d, tree 108d, passerby 112d and image background 114d.

Image 100d illustrates how content present in first image 100a may be progressively faded out while features of a second image 100e may be correspondingly faded in as part of a transition from image 100a to image 100e. Further, image content may be blended during the transition between images to reduce visible seams and other noticeable differences resulting from different image qualities, colors, viewpoints and content.

For example, a portion of left neighboring house 104d, a portion of right neighboring house 106d, and tree 108d are increasingly faded out during the progression of the transition from image 100a to 100e (as illustrated by dashed lines). At the same time, visual intensity of content included second image 100e, such as house 102d and passerby 112d, is increased. Further, background 114d is blended to produce a consistent shade, which is darker than background 114c, but lighter than background 114e.

FIG. 1E presents second image 100e, which represents the endpoint of the transitioning of the interface, according to an embodiment. Second image 100e includes house 102e, left neighboring house 104e, right neighboring house 106e, passerby 112e and image background 114e. Second image 100e provides a close-up view of house 102e while capturing a few additional details of the surrounding neighborhood at a different point in time than first image 100a, according to an embodiment.

Figure 2:
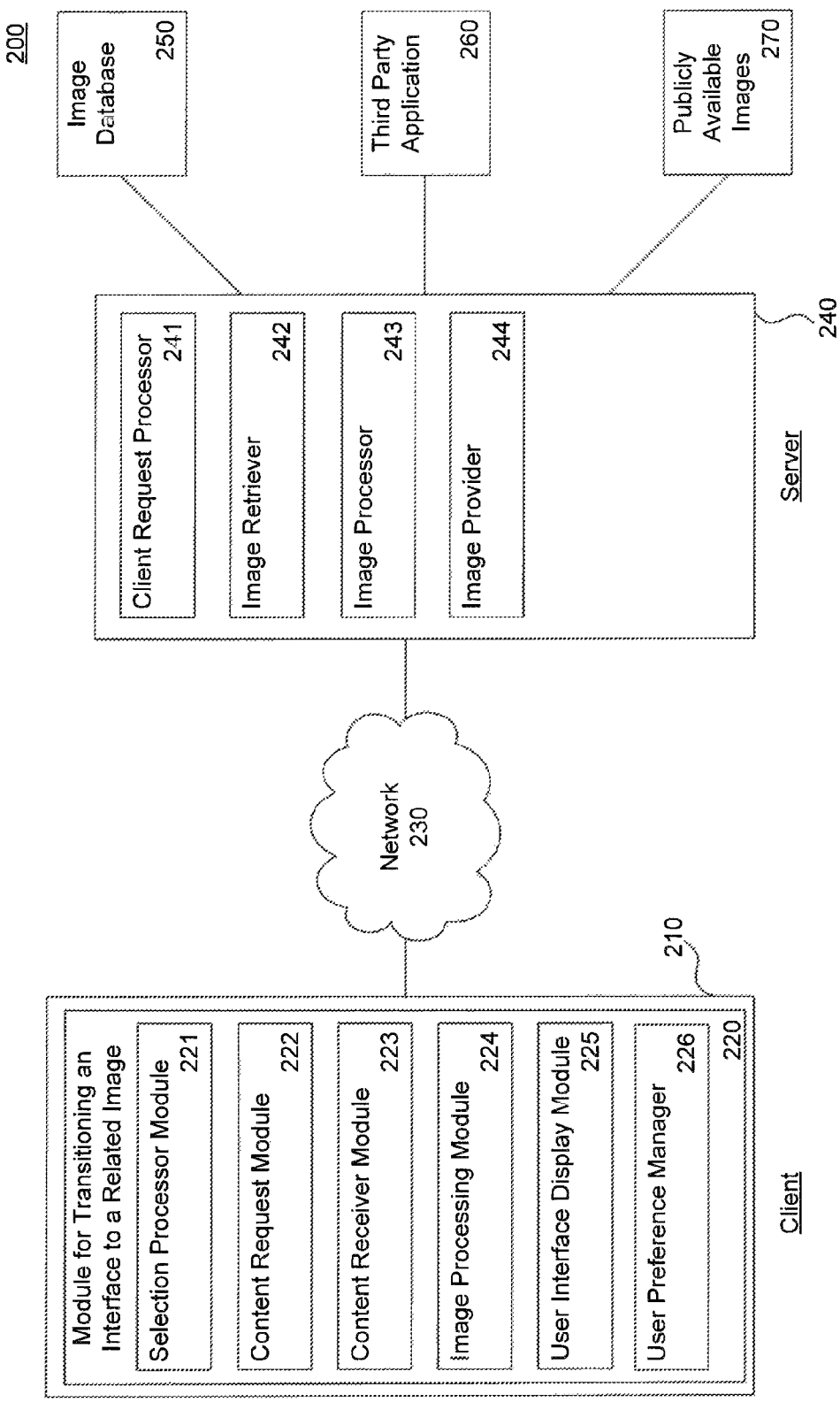
FIG. 2 is a diagram illustrating a system for transitioning an interface to a related image, according to an embodiment.

FIG. 2 is a block diagram illustrating a system 200 for transitioning an interface to a related image. System 200 includes client 210, module for transitioning an interface to a related image 220, selection processor module 221, content request module 222, content receiver module 223, image processing module 224, user interface display module 225, user preference manager 226, network 230, server 240, client request processor 241, image retriever, 242, image processor 243, image provider 244, image database 250, third party application 260, and publicly available images 270. System 200, or any combination of its components, may be part of, or may be implemented using, one or more types of computing systems.

According to an embodiment, client 210, or any combination of its components, may be part of, or may be implemented using, one or more client-based computing devices. For example, client 210 may be any computing device designed for personal use by a user or integrated with other systems or devices for use by an end-user. Client 210 may include any computing device such as a desktop computer, laptop, tablet, mobile phone, smartphone, gaming system, navigation device, portable media player, mobile device, electronic device, and computing devices embedded into other systems, including but not limited to, automobiles and appliances.

Such computing devices may include software, firmware, hardware, or any combination thereof. Software may include one or more applications and an operating system. Hardware may include, but is not limited to, a processor, memory, input and output devices, storage devices, and user interface display. Client 210 also may include any other type of computer system having at least one processor and memory. In addition, client 210 may include its own display or may interact with one or more other systems and devices, which include a display capable of providing graphical content to an end-user.

Client 210, server 240, or any combination of components used to implement system 200, can be configured to access content hosted on servers over a network 230. The network can be any network or combination of networks that can carry data communications. Such a network can include, but is not limited to, a wired (e.g., Ethernet) or a wireless (e.g., Wi-Fi and 4G) network. In addition, the network may include, but is not limited to, a local area network, and/or wide area network. The network can support protocols and technology including, but not limited to, Internet or World Wide Web protocols and/or services. Intermediate network routers, gateways, or servers may be provided between servers and clients depending upon a particular application or environment.

According to another embodiment, server 240, or any combination of its components, may be part of, or may be implemented using, one or more server-based computing devices. Such server-based computing devices may include, but are not limited to, one or more standalone servers, distributed computing systems, clustered computer systems, cloud computer systems, grid computer systems, embedded systems, stand-alone electronic devices, networked devices, rack servers, set-top boxes, or any other type of computer system having at least one processor and memory.

According to other embodiments, one or more server 240 components (241-244) may exist on client 210. Additionally, one or more client 210 components (221-226) may exist on server 240.

Client 210 includes a module for transitioning an interface to a related image 220, which further includes selection processor module 221, content request module 222, content receiver module 223, image processing module 224, user interface display module 225 and user preference manager 226. Selection processor module 221 performs various tasks associated with identifying and handling user input received from a user interface. In one embodiment, selection processor module 221 may perform detection, collection, analysis, processing, and routing of user requests received from a user interface.

In another embodiment, content request module 222 requests image information and other content from server 240. According to another embodiment, content request module 222 may directly request image information and image content from other applications and systems, such as image database 250, third party application 260, and publicly available images 270.

According to an embodiment, content receiver module 223 receives image information and image content from server 240. For example, content receiver module 223 may receive images and other content from one or more other systems and applications such as image database 250, third party application 260, and publicly available images 270.

Image processing module 224 performs analysis, processing, and modification of imagery available to client 210. According to an embodiment, image processing module 224 is configured to work with multiple image types including one or more of 2D images, 3D images, panoramic imagery, video content, etc. Image processing module 224 may determine image properties by directly analyzing visual content of an image. Image processing module 224 also may analyze and process data describing various attributes associated with an image.

According to another embodiment, image processing module 224 may be configured to determine that one or more relationships exist between a plurality of imagery. For example, image processing module 224 may identify a geographic relationship or homography between images by analyzing and interpreting image content, image properties, and other available information, which may indicate or describe a relationship between images.

User interface display module 225 manages rendering and display of content and images on client 210. According to an embodiment, user interface display module 225 may perform additional processing on any content or images that it receives and also may display content and images without any additional modification or processing. Further, user interface display module 225 may modify content and images based on performance and display capabilities of the computer system associated with client 210.

User preference manager 226 enables a user to manage and save user preferences associated with a module for transitioning an interface to a related image 220. According to an embodiment, user preference manager 226 may be configured to allow users to specify one or more types, sources, properties, and qualities of imagery for retrieval and display by a module for transitioning to a related image 220. User preference manager 226 also may be configured to allow users to rank, filter, and exclude various types of available imagery by image type, image source, and/or one or more image properties.

Network 230 represents a system of interconnected computer networks, which client 210 may use to communicate with any external system or application, including server 240, image database 250, third party application 260, and publicly available images 270. According to other embodiments, communication between client 210 and other computer systems and software applications is not limited to the internet and may occur using any type of network including local, private, wired, and wireless computer network.

Server 240 includes client request processor 241, image retriever 242, image processor 243, and image provider 244. Further, server 240 may interact with one or more additional systems providing direct or indirect access to image database 250, third party application 260, and publicly available images 270.

Client request processor 241 receives incoming requests from client 210. According to an embodiment, client request processor 241 may receive, process, delegate, and forward incoming requests received from client 210. According to another embodiment, client request processor 241 may interact with image retriever 242, image processor 243, and image provider 244 to process and respond to requests from client 210.

Image retriever 242 obtains available images and/or available image data from one or more systems, applications, and databases, which may be located on server 240 or one or more external computer systems. Image retriever 242 also may obtain available images and information about available images from image database 250, third party application 260, and publicly available images 270.

Image processor 243 is used to process, analyze, gather, and store information about images. According to an embodiment, image processor 243 receives images and information about images from image retriever 242. Image processor 243 then may gather additional information about the images, analyze the images, extract image properties, extract image features, match image features, and determine relationships among images. Further, image processor 243 also may generate, index, and store information about the images and image relationships. Image processor 243 also may be configured to facilitate storage of image content including actual images or reduced-size versions of images. Results of image processing may be stored on server 240, in image database 250, and on one or more other computer systems. Further, image processing results may be retrieved and referenced as part of handling requests from client 210.

Image provider 244 is responsible for returning imagery and image-related information to client 210. According to an embodiment, image provider 244 returns information about images for a geographic location based on a request from client 210. For example, image provider 244 may provide an online location for an image, details about the properties or qualities of an image, and information describing image relationships.

Image database 250 represents a collection of available imagery and information describing the imagery. According to an embodiment, image database 250 may contain original images, modified images, image copies, and links to available images. Additionally, image database 250 may contain information about an image, including one or more online locations, a geographical location associated with an image, image properties, and details about one or more image relationships.

Third party application 260 may include any application or website where shared imagery is accessible. According to an embodiment, image processor 243 may be configured to gather information about shared photographs from one or more third party applications 260, such as photo-sharing and social networking websites, either directly or through an application programming interface.

Publicly available images 270 may include any shared images that are accessible on the internet. Publicly available images may exist as content displayed on individual websites and may be images presented in photo galleries, image collections, and online databases. Further, publicly available images 270 and associated information may be located or collected by one or more applications, including search engine processes configured to identify, retrieve, and index web content.

Figure 3:
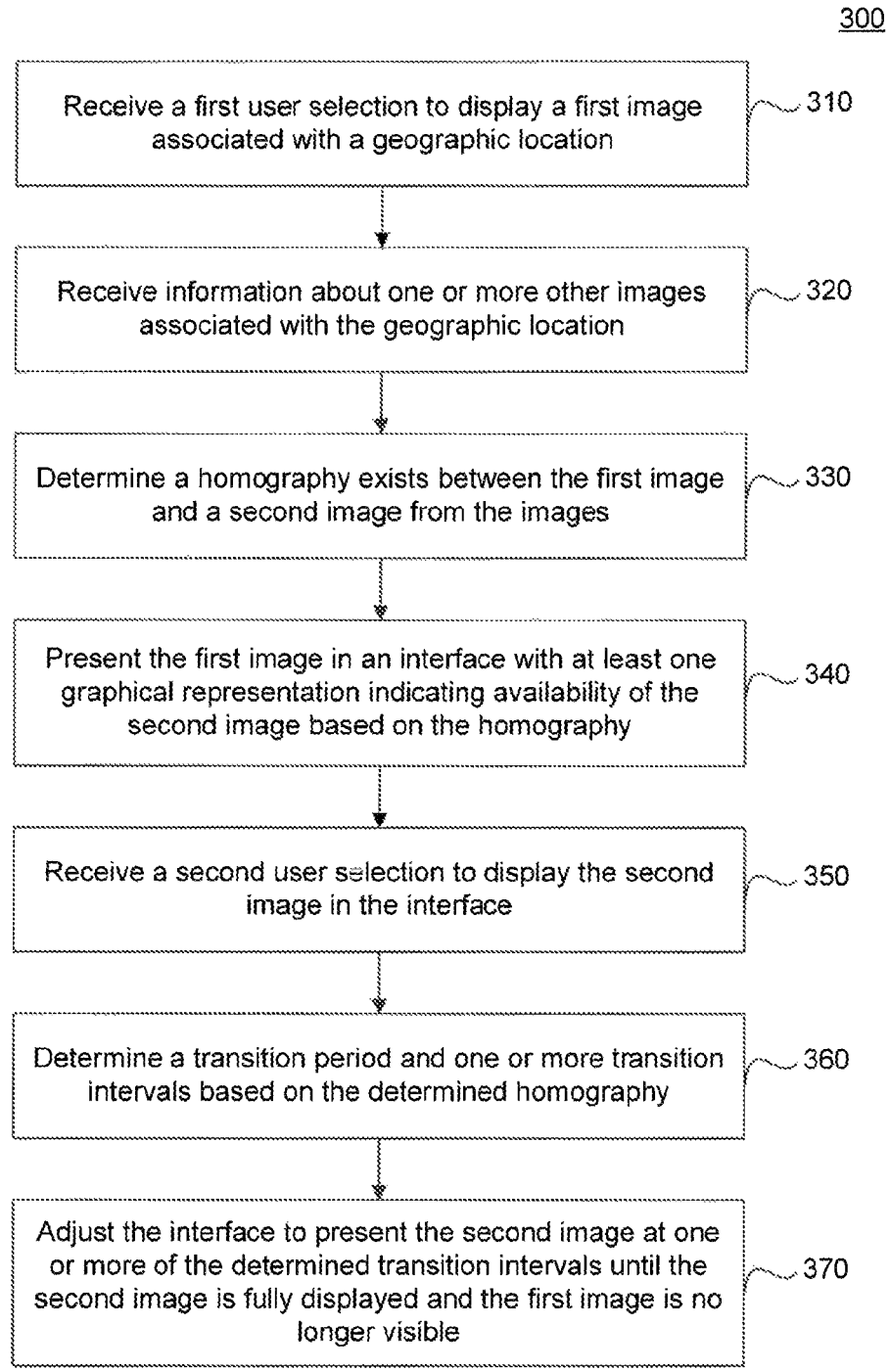
FIG. 3 and FIG. 4 are flow diagrams of methods for transitioning an interface to a related image, according to an embodiment.

FIG. 3 is a flow diagram of a method for transitioning an interface to a related image, according to an embodiment. Method 300 begins at stage 310, when a first user selection to display a first image associated with a geographic location is received.

According to an embodiment, a user may select a first image by clicking an indication of an available image that has been presented with a map interface. According to another embodiment, a user may select an indication of an available image that is presented with panoramic imagery. According to additional embodiments, a user may select a geolocated image using any available features provided by an application or web interface. Stage 310 may be performed by, for example, selection processor module 221, which may receive and process user requests.

At stage 320, information regarding one or more available images associated with the geographic location is received. According to an embodiment, content request module 222 submits a request to server 240 to obtain information about imagery near the geographic location of the first image. Client request processor 241 receives and processes the request. Image provider 244 uses data previously gathered and determined by image processor 243 to identify relevant images and image information that will be returned to client 210. Stage 320 may be performed by, for example, content receiver module 223.

At stage 330, the existence of a homography between the first image and one or more of the images associated with the geographic location is determined. According to an embodiment, image processing module 224 analyzes incoming information about the one or more available images previously determined by image processor 243. The information may describe one or more relationships between the first image and the available images received in stage 320.

According to an alternative embodiment, image processing module 224 may perform feature identification and feature matching on one or more images to determine that a homography exists between two images. For example, image processing module 224 may extract one or more features present in the first image, extract one or more features present in the second image, and match one or more features extracted from the first image with one or more features extracted from the second image. Stage 330 may be performed by, for example, image processing module 224.

At stage 340, the first image is presented in an interface with at least one graphical representation indicating the availability of one or more related images. According to an embodiment, the first selected image is displayed in a web browser on client 210. Stage 340 may be performed by, for example, user interface display module 225.

At stage 350, a second user selection to display a second image is received. In an embodiment, the second image may have the same image type as the first image. For example, the second selection performed by the user enables the user to transition to another two-dimensional photograph or from one scene of a navigable panorama to another. In an alternative embodiment, a user may transition between different image types. For example, the user may transition from a two-dimensional image to a panorama (or vice versa). Stage 350 may be performed by, for example, selection processor module 221.

At stage 360, a transition period and a set of transition intervals are determined for transitioning from the first image to the second image, based on the determined homography. According to an embodiment, the transition period and the number of transition intervals each may be based on their own configuration values. For example, a transition period of one second may be defined for every transition. Further, every transition period may have ten transition intervals with each transition interval occurring at every tenth of a second throughout the transition period.

According to another embodiment, one or both the transition period and the number of transition intervals may be determined dynamically. For example, the transition period and/or the number of transition intervals within the transition period may be based on one or more of the quality of the first image, the quality of the second image, the number of matching features in the first and the second image, details of the homography between the first and the second image, and the processing capabilities of client 210. Stage 360 may be performed by, for example, user interface display module 225.

At stage 370, the interface is incrementally adjusted to gradually present the second image during one or more of the determined transition intervals while also gradually removing the first image from the interface. The adjusting is performed continually until the second image is fully displayed in the interface and the first image is no longer visible.

In an embodiment, the adjusting may be performed at one or more of the transition intervals by first determining a region of the second image to blend with a corresponding area of the first image, based on the homography. A region of the second image and/or a corresponding area of the first image may be determined prior to or during one or more of the transition intervals. In addition, the region of the second image and/or the corresponding area of the first image may be determined based on one or more of matching features within the first image and the second image, size and/or shape of the first image, size and/or shape of the second image, total transition duration, remaining transition duration, a total number of transition intervals, a number of remaining number of transition intervals, processing capabilities of client 210, and graphical presentation capabilities of client 210.

In an embodiment, the determined region of the second image may be overlaid onto the corresponding area of the first image, and one or more portions of each may be blended together to provide and/or enhance visual consistency between the image content. For example, blending may be performed at one or more of the transition intervals to reduce visible seams and other noticeable differences occurring when the determined region of the second image is overlaid, aligned, matched, and/or combined with the corresponding area of the first image. Blending also may be used to reduce and alleviate other visible differences between images, which may occur, for example, due to differences in one or more of image background, coloring, lighting, perspective, qualities and other image properties and features.

In another embodiment, the interface may be updated at one or more of the transition intervals to progressively fade out the first image by gradually decreasing its visual intensity and presence within the interface. Further, the second image may be gradually and correspondingly faded in by increasing its visual intensity and presence within the interface. For example, visual intensity of images may be adjusted proportionally based on a number of transition intervals within a transition period. Thus, visual intensity of an image would be increased/decreased by 10 percent for a transition period having ten transition intervals. In other embodiments, images may be faded in and out at varying degrees. The coordinated blending, fading, and adjusting described in the embodiments above allow the interface to be smoothly and consistently transitioned from the first image to the second image.

In an exemplary embodiment, multi-band blending is used to blend image content and reduce the presence of noticeable seams and other visual inconsistencies that may exist between two different images. Multi-band blending may be used to help alleviate variations in image content (such as color, brightness, and quality), which may occur when matching and combining publicly-shared images because such images are very likely to have been captured at different times, by different authors, using different equipment, according to different settings, and perhaps with different surroundings. Multi-band blending allows variations to be blended for consistency while preserving the quality of the details provided by each image. Stage 370 may be performed by, for example, user interface display module 225.

Figure 4:
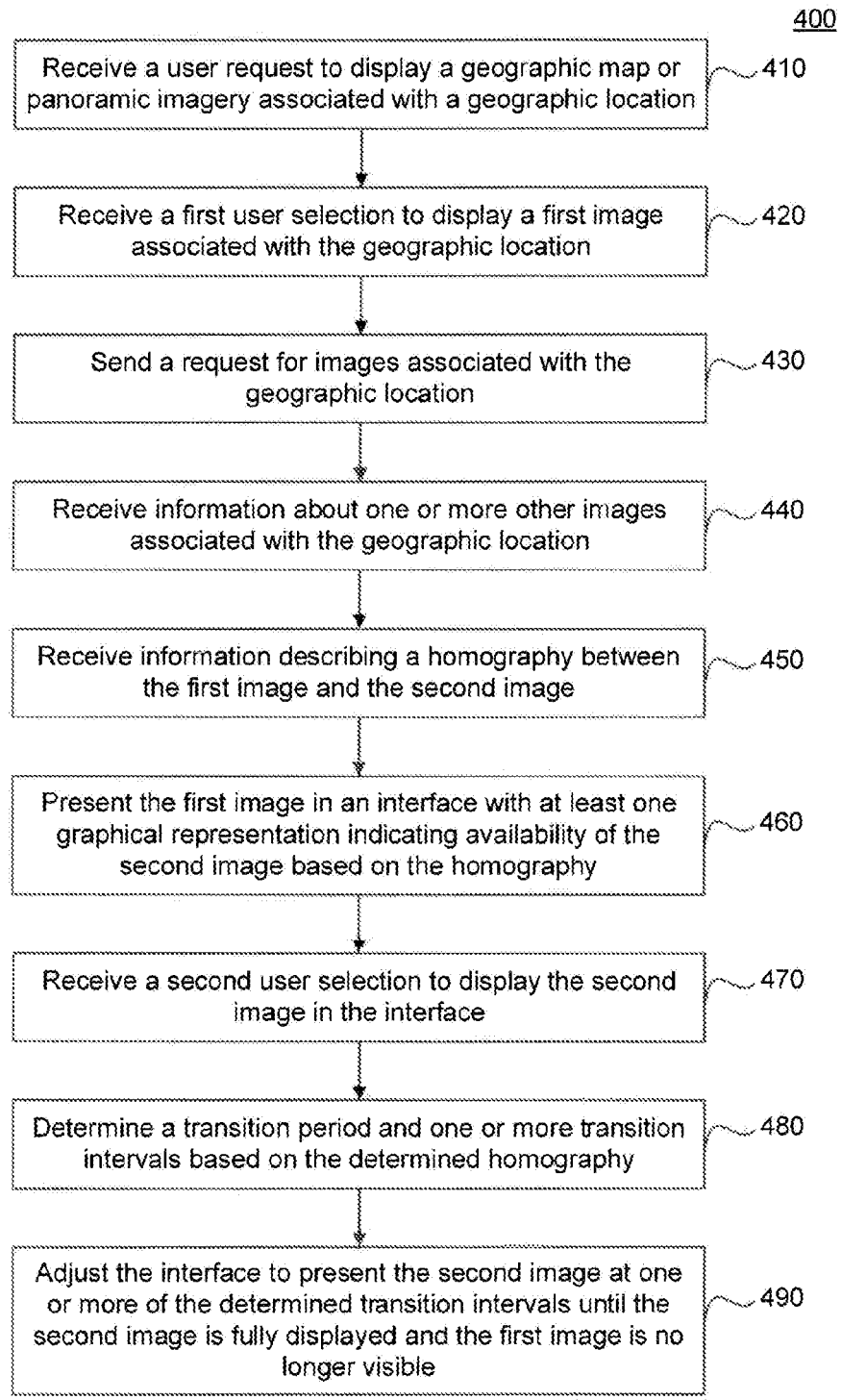

FIG. 4 is a flow diagram of another method 400 for transitioning an interface to a related image, according to an embodiment.

Method 400 begins at stage 410, when a user request to display a geographic map or panoramic imagery is received. According to an embodiment, a user may initiate a request to display a map or panorama by textually specifying an address or a geographic location using functionality provided by an online map service. A user also may graphically select such content by interacting with geolocated images displayed in an interface. For example, a user may click or zoom on a previously displayed map that has been presented in a web browser interface. Stage 410 may be performed by, for example, selection processor module 221, which may receive and process user selections from an interface.

At stage 420, a first user selection to display a first image associated with a geographic location is received. An image may be any two-dimensional or three-dimensional content captured by an optical device. For example, an image may be a 2D image, a 3D image, panoramic imagery, video content, etc.

According to an embodiment, a user may select a first image based on a link or indication of the image that is presented with a map or other image-based content. According to another embodiment, a user may select the first image by specifying a file name, choosing a file, or performing any other process that allows the user to specify the first image for selection.

In some embodiments, the first image is a geolocated image that includes geospatial metadata and may include at least one or more of positional coordinates, latitude and longitude, altitude, bearing, distance, accuracy, and location name. In other embodiments, geographical metadata may be stored separately and apart from the image. For example, geographical metadata for an image may exist in a separate file, database, or other location. Such information may be referenced based on a unique identifier associated with the image. Stage 420 also may be performed by, for example, selection processor module 221.

At stage 430, client 210 sends a request for images related to the geographic location associated with the first image. According to an embodiment, client 210 requests information about images near the geographic location of the first image. Client 210 may request information about images and actual image content from one or more of server 240, image database 250, third party application 260, publicly available images 270, and one or more other computer systems.

According to another embodiment, client 210 sends a first request for information about imagery for a geographic location to server 240. Next, client 210 receives a response from server 240 containing the requested information. Client 210 then may send one or more additional requests for image content or information about images to server 240, image database 250, third party application 260, publicly available images 270, and one or more other computer systems based on the response. For example, server 240 may provide information about images that client 210 uses for obtaining image content. Stage 430 may be performed by, for example, selection processor module 222.

At stage 440, client 210 receives information about one or more other images associated with the geographic location of the first image. According to an embodiment, client 210 receives information about images in response to a request it has made. In another embodiment, image information may be pushed to client 210 from one or more external sources. Stage 440 may be performed by, for example, content receiver module 222.

At stage 450, information describing a homography between the first image and the second image is received. According to an embodiment, such information may be used to provide additional visual content and annotations for display with the first image in the interface. Stage 450 may be performed by, for example, content receiver module 222.

At stage 460, the first image selected by the user is presented in an interface with at least one graphical representation indicating availability of the second image. According to an embodiment, the positioning and attributes of content and indications of other available imagery may be determined based on a homography that exists between the first image and the second image. Indicators of other available geolocated imagery may include graphical icons, text, shading, thumbnail images, and other visual ways of notifying the user about the availability of other imagery. For example, the availability of a second image may be indicated by superimposing a thumbnail version of the second image onto the first image, which could be a panorama or other type of image. In addition, the location of where the thumbnail of the second image is positioned on the first image may be based on a homography existing between the first image and the second image. Further, indications of other available imagery may be presented or suppressed based on one or more user preferences, which may include image type, image source, one or more image properties, and one or more visual qualities of an image. Stage 460 may be performed by, for example, user interface display module 225.

At stage 470, a second user selection to display the second image in the interface is received. According to an embodiment, the second user selection initiates the process of adjusting the interface from the first image to the second image. Stage 470 may be performed by, for example, selection processor module 221.

At stage 480, a transition period and one or more transition intervals for the transition period are determined for transitioning the interface from the first image to the second image. According to an embodiment, a transition period is a measurement of time used to complete an entire transition from the first image to the second image. The transition period includes one or more transition intervals or transition points where image blending, fading, and/or image alteration may occur to provide a smooth transition from the first image to the second image.

Image alteration generally refers to the modification of an image and/or image content, which may include shrinking, expanding, and cropping an image. For example, in an embodiment, portions of the first image and/or the second image may be modified at any point during the transition between the first image and the second image, to facilitate presentation. Further, image manipulation also may include, but is not limited to, modifying one or more image characteristics, such as background lighting within an image, image brightness, image contrast, image color, image texture, image size, image shape, image quality, and other image properties.

At stage 490, the interface is adjusted to present the second image at one or more of the determined transition intervals until the second image is fully displayed and the first image is no longer visible. According to an embodiment, the second image may be incrementally introduced and blended with the first image at each transition interval. For example, the features of the second image may increase in number and in prominence at each transition interval, while features of the first image may be reduced in number and gradually phased out at each subsequent transition interval. Such introduction and removal of features during image transitioning may be aided, for example, by using fading and/or dissolving techniques. Further, adjustment of the interface may be accomplished, for example, by updating the interface to display each transition interval in a sequence for an entire transition duration period.

In another embodiment, a region of the second image and a matching, corresponding area of the first image may be determined for each transition interval. For example, the region and corresponding area may be based on a number of matching features within the first image and the second image. The determined region and corresponding area may also be based on image size, image features, determinations made for one or more previous transition intervals, and/or determinations made for one or more subsequent transition intervals. In addition, the region and corresponding area determined for a particular transition interval respectfully may be smaller, larger, or entirely different as compared to determinations made for previous or subsequent intervals.

In an embodiment, one or more portions of the second image are blended with the first image at each transition interval as part of the transition to smooth edges, reduce visible seams, and minimize the presence of other differences that may become noticeable when sections of related, but different images are aligned and/or combined. For example image coloring, quality, brightness, background lighting, and other properties may differ slightly or dramatically between two different images that capture the same scenery. Such differences may be blended uniformly or at varying and incremental degrees throughout the transition between images.

Example Computer System

Figure 5:
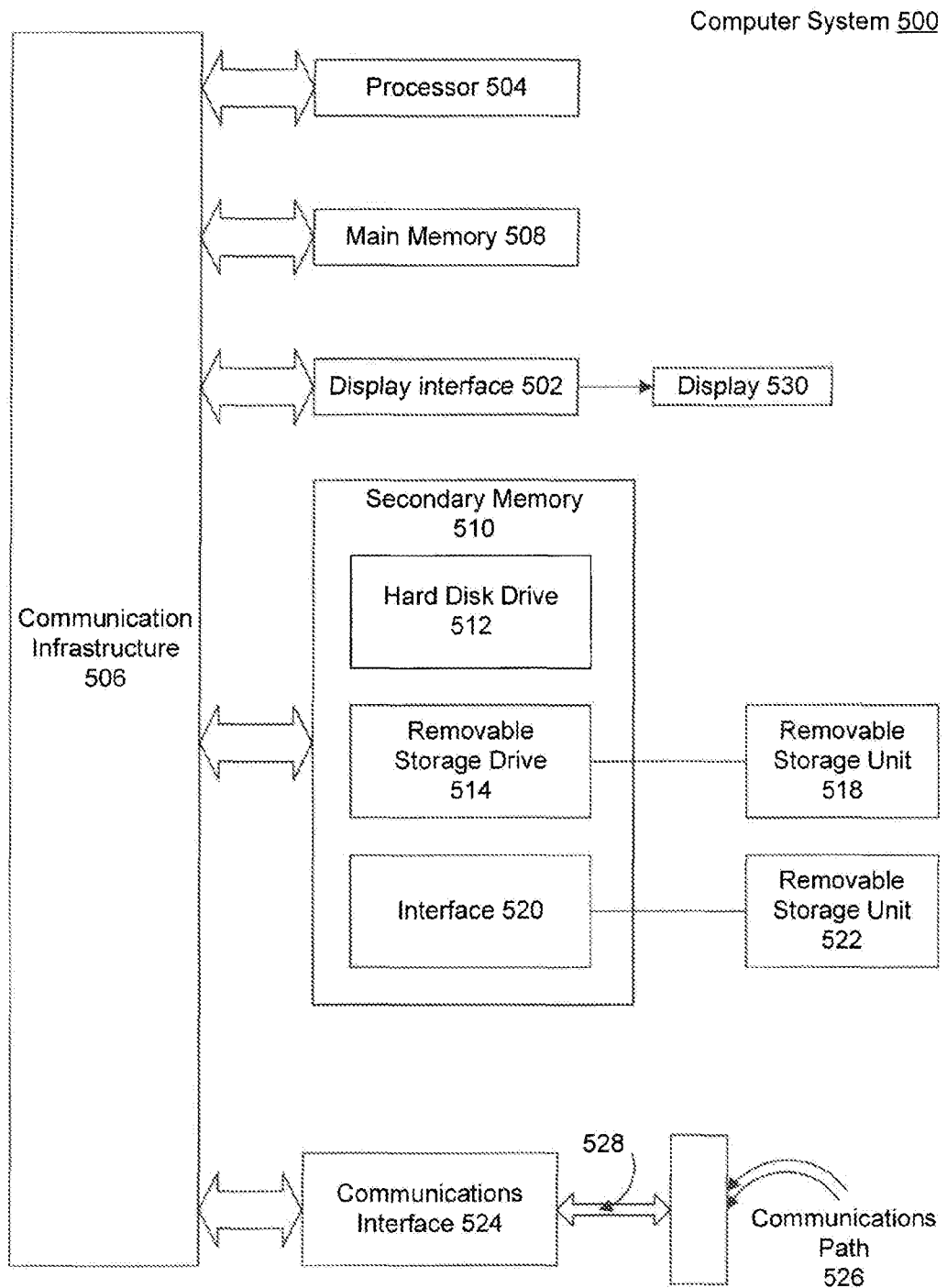
FIG. 5 is a diagram of an exemplary computer system that may be used in an embodiment.

In an embodiment, the system and components of embodiments described herein are implemented using well-known computers, such as example computer system 400 shown in FIG. 5. For example, system 200, client 210, module for transitioning an interface to a related image 220, server 240, image database 250, third party application 260, and additional embodiments for transitioning an interface to a related image may be implemented using one or more computer systems, such as example computer system 500.

Computer system 500 includes one or more processors (also called central processing units, or CPUs), such as a processor 504. Processor 504 is connected to a communication infrastructure 506.

Computer system 500 also includes a main or primary memory 508, such as random access memory (RAM). Main memory 508 has stored control logic (computer software), and data.

Computer system 500 may also include one or more secondary storage devices 510. Secondary storage device 510 includes, for example, a hard disk drive 512 and/or a removable storage device or drive 514, as well as other types of storage devices, such as memory cards and memory sticks. Removable storage drive 514 represents a floppy disk drive, a magnetic tape drive, a compact disk drive, an optical storage device, tape backup, etc.

Removable storage drive 514 may interact with a removable storage unit 518. Removable storage unit 518 includes a computer useable or readable storage device having stored thereon computer software (control logic) and/or data. Removable storage unit 518 represents a floppy disk, magnetic tape, compact disk, DVD, optical storage disk, or any other computer data storage device. Removable storage drive 514 may read from and/or write to removable storage unit 518 in a well-known manner.

Computer system 500 also includes input/output/display devices 530, such as monitors, keyboards, pointing devices, etc., which communicate with communication infrastructure 506 through a display interface 502.

Computer system 500 further includes a communication or network interface 524. Communication interface 524 may enable computer system 500 to communicate with remote devices. For example, communication interface 524 may allow computer system 500 to communicate over communications path 526, such as LANs, WANs, the Internet, etc. Communications interface 524 may interface with remote sites or networks via wired or wireless connections.

Control logic may be transmitted to and from computer system 500 via communication path 526.

Any tangible apparatus or article of manufacture comprising a computer useable or readable medium having control logic (software) stored thereon is referred to herein as a computer program product or program storage device. This includes, but is not limited to, computer system 500, main memory 508, secondary storage device 510, and removable storage unit 518. Such computer program products, having control logic stored thereon that, when executed by one or more data processing devices, causes such data processing devices to operate as described herein, represent embodiments of the invention.

Embodiments can work with software, hardware, and/or operating system implementations other than those described herein. Any software, hardware, and operating system implementations suitable for performing the functions described herein can be used. Embodiments are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described embodiments.

In addition, the foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A computer-implemented method for transitioning an interface to a related image comprising:
    determining by one or more processors, based on a homography between a first image and a second image different from the first image, a region of the second image to overlay onto a corresponding area of the first image, wherein the homography between the first image and the second image is determined according to feature matching between the first image and the second image;
    blending, by one or more processors, the determined region with the corresponding area at one or more transition intervals of a transition period to reduce visible seams occurring between the first image and the second image; and
    updating, by one or more processors, the interface by gradually decreasing visual intensity of the first image while gradually and proportionally increasing visual intensity of the second image until the second image is fully displayed and the first image is no longer visible at an end of the transition period.

2. The method of claim 1, further comprising presenting the first image in the interface with at least one graphical representation indicating availability of the second image according to the homography.

3. The method of claim 1, further comprising determining the transition period and a plurality of the transition intervals in the transition period according to the homography.

4. The method of claim 1, wherein the blending at the one or more transition intervals is performed according to matching features in both the first image and the second image.

5. The method of claim 1, wherein the blending is performed using multi-band blending.

6. The method of claim 1, wherein the updating further comprises gradually transitioning one or more lighting characteristics of the first image towards one or more lighting characteristics of the second image at the one or more transition intervals.

7. A system for transitioning an interface to a related image, comprising:
   one or more processors; and
      a user interface display module configured to adjust, using the one or more processors, the interface by:
         determining, based on a homography between the a first image and a second image different from the first image, a region of the second image to overlay onto a corresponding area of the first image, wherein the homography between the first image and the second image is determined according to feature matching between the first image and the second image;
         blending the determined region with the corresponding area at one or more transition intervals of a transition period to reduce visible seams occurring between the first image and the second image; and
         updating the interface by gradually decreasing visual intensity of the first image and gradually and proportionally increasing visual intensity of the second image until the second image is fully displayed and the first image is no longer visible at an end of the transition period.

8. The system of claim 7, wherein the user interface display module is further configured to present the first image in the interface with at least one graphical representation indicating availability of the second image according to the homography.

9. The system of claim 7, comprising an image processing module configured to determine, using the one or more processors, the transition period and a plurality of the transition intervals in the transition period according to the homography.

10. The system of claim 7, wherein the blending at the one or more transition intervals is performed according to matching features in both the first image and the second image.

11. The system of claim 7, wherein the blending is performed using multi-band blending.

12. The system of claim 7, wherein the updating further comprises gradually transitioning one or more lighting characteristics of the first image towards one or more lighting characteristics of the second image at the one or more transition intervals.

13. A non-transitory computer-readable storage device having control logic recorded thereon that, when executed by one or more processors, causes the one or more processors to perform operations to transition an interface to a related image, the operations comprising:
   determining, based on a homography between a first image and a second image different from the first image, a region of the second image to overlay onto a corresponding area of the first image, wherein the homography between the first image and the second image is determined according to feature matching between the first image and the second image;
   blending the determined region with the corresponding area at one or more transition intervals of a transition period to reduce visible seams occurring between the first image and the second image; and
   updating the interface by gradually decreasing visual intensity of the first image and gradually and proportionally increasing visual intensity of the second image until the second image is fully displayed and the first image is no longer visible at an end of the transition period.

14. The non-transitory computer-readable storage device of claim 13, the operations further comprising presenting the first image in the interface with at least one graphical representation indicating availability of the second image according to the homography.

15. The non-transitory computer-readable storage device of claim 13, the operations further comprising determining the transition period and a plurality of the transition intervals in the transition period according to the homography.

16. The non-transitory computer-readable storage device of claim 13, wherein the blending at the one or more transition intervals is based on matching features in both the first image and the second image.

17. The non-transitory computer-readable storage device of claim 13, wherein the blending is performed using multi-band blending.

18. The non-transitory computer-readable storage device of claim 13, wherein the updating further comprises gradually transitioning one or more lighting characteristics of the first image towards one or more lighting characteristics of the second image at the one or more of the transition intervals.

* * * * *